US007527269B2

(12) United States Patent  
Tiefenbach et al.

(10) Patent No.: US 7,527,269 B2  
(45) Date of Patent: May 5, 2009

(54) CYLINDER HEAD GASKET HAVING DEFORMATION DELIMITING DEVICES RADIALLY INSIDE AND OUTSIDE SEALING BEAD

(75) Inventors: Thomas Tiefenbach, Dettingen (DE); Armin Diez, Lenningen (DE); Wolfgang Fritz, Metzingen (DE)

(73) Assignee: ElringKlinger AG, Dettingen (DE)

( * ) Notice: Subject to any disclaimer, the term of this patent is extended or adjusted under 35 U.S.C. 154(b) by 0 days.

(21) Appl. No.: 11/033,247

(22) Filed: Jan. 11, 2005

(65) Prior Publication Data
US 2006/0055121 A1 Mar. 16, 2006

(30) Foreign Application Priority Data
Sep. 10, 2004 (DE) .................... 10 2004 044 851

(51) Int. Cl.
*F02F 11/00* (2006.01)
*F16J 15/08* (2006.01)
(52) U.S. Cl. ........................... 277/593; 277/595
(58) Field of Classification Search ............... 277/593, 277/594, 595, 597
See application file for complete search history.

(56) References Cited

U.S. PATENT DOCUMENTS

| | | | | | |
|---|---|---|---|---|---|
| 1,839,336 | A | * | 1/1932 | Oven | 277/598 |
| 1,844,052 | A | * | 2/1932 | Bailey | 277/598 |
| 4,728,110 | A | * | 3/1988 | Nakasone | 277/595 |
| 4,799,695 | A | * | 1/1989 | Yoshino | 277/592 |
| 4,869,516 | A | * | 9/1989 | Udagawa et al. | 277/595 |
| 4,880,669 | A | * | 11/1989 | Dorn et al. | 427/210 |
| 5,232,229 | A | * | 8/1993 | Udagawa | 277/595 |
| 5,472,217 | A | * | 12/1995 | Hagiwara et al. | 277/596 |
| 5,584,490 | A | * | 12/1996 | Inoue et al. | 277/595 |
| 5,876,038 | A | * | 3/1999 | Bohm et al. | 277/593 |
| 6,036,195 | A | | 3/2000 | Udagawa | 277/595 |
| 6,189,895 | B1 | * | 2/2001 | Yamada | 277/591 |
| 6,250,645 | B1 | * | 6/2001 | Udagawa | 277/595 |
| 6,712,364 | B2 | * | 3/2004 | Unseld et al. | 277/592 |
| 6,769,696 | B2 | | 8/2004 | Diez et al. | 277/593 |
| 6,814,357 | B2 | | 11/2004 | Diez et al. | 277/593 |
| 6,926,282 | B2 | * | 8/2005 | Werz et al. | 277/591 |
| 7,000,924 | B2 | * | 2/2006 | Hohe et al. | 277/593 |
| 2002/0011709 | A1 | * | 1/2002 | Jinno et al. | 277/593 |
| 2003/0062691 | A1 | * | 4/2003 | Diez et al. | 277/590 |
| 2004/0041352 | A1 | * | 3/2004 | Hohe et al. | 277/593 |
| 2004/0160017 | A1 | * | 8/2004 | Diez et al. | 277/593 |

(Continued)

FOREIGN PATENT DOCUMENTS

EP  0 306 766 A2 * 3/1989

(Continued)

*Primary Examiner*—Gay Ann Spahn

(57) ABSTRACT

Cylinder head gasket is provided having a single-layered or multilayered metallic gasket plate with sealing beads in at least one metal layer, which are elastically deformable in height and surround the combustion chamber through-openings, and deformation delimiting devices which delimit the flattening of the sealing beads. In order to achieve as good a sealing function as possible in the long term and as good a protection as possible of the sealing beads against inadmissibly high deformations during operation of the engine, the deformation delimiting devices, one of which is formed by a meandering bead stamped into a metal layer, and the other by a plurality of elevations stamped out of a metal layer, are provided radially inside and radially outside of the sealing beads.

14 Claims, 2 Drawing Sheets

U.S. PATENT DOCUMENTS

2004/0183260 A1 * 9/2004 Kestly .................. 277/593
2005/0173868 A1 * 8/2005 Hatamura et al. .......... 277/593

FOREIGN PATENT DOCUMENTS

| | | | |
|---|---|---|---|
| EP | 0 470 790 A1 | * | 2/1992 |
| EP | 1298364 | | 4/2003 |
| EP | 1298365 | | 4/2003 |
| JP | 61-88075 A | * | 6/1986 |
| JP | 11-002324 A | * | 1/1999 |
| JP | 2004-503731 | * | 5/2004 |
| JP | 2004-144119 A | * | 5/2005 |
| JP | 2006-144987 A | * | 8/2006 |
| WO | WO 01/96768 A1 | * | 12/2001 |

* cited by examiner

CYLINDER HEAD GASKET HAVING DEFORMATION DELIMITING DEVICES RADIALLY INSIDE AND OUTSIDE SEALING BEAD

The present disclosure relates to the subject matter disclosed in German application No. 10 2004 044 851.5 of Sep. 10, 2004, which is incorporated herein by reference in its entirety and for all purposes.

BACKGROUND OF THE INVENTION

The invention relates to a cylinder head gasket with a single-layered or multilayered, at least substantially metallic gasket plate comprising for a sealing bead which is elastically deformable in height and surrounds a combustion chamber through-opening of the gasket a so-called double stopper for delimiting the bead deformation with a deformation delimiting device arranged radially inside the sealing bead and radially outside the sealing bead.

Such a cylinder head gasket is disclosed in EP-1 298 364-A of ElringKlinger A G (see lines 1-3 of page 6). In a gasket with a multilayered gasket plate, the deformation delimiting devices (stoppers) can all be provided on the sheet metal layer (so-called functional layer) provided with the sealing bead or on one or several of the other layers. It is, however, also possible to provide one stopper on the functional layer and another stopper on another layer. In a first embodiment of the cylinder head gasket according to EP-1 298 364-A, a single stopper is arranged between the combustion chamber through-opening and the associated sealing bead. The stopper is formed by a honeycomb pattern, surrounding the combustion chamber through-opening as a ring closed within itself, of knob-like elevations stamped out of the functional layer. In two further embodiments, the knob pattern is replaced either by a bead stamped into the functional layer, which, in a plan view of the gasket plate or the functional layer, forms a meander extending in circumferential direction of the combustion chamber through-opening, or by a crown, surrounding the combustion chamber through-opening, of short beads stamped into the functional layer and extending radially in relation to the combustion chamber through-opening.

EP-1 298 365-A of ElringKlinger A G discloses a multilayered metallic cylinder head gasket having two functional layers each with an elastic sealing bead surrounding a combustion chamber through-opening and with a further metal layer arranged between the functional layers, which is provided with a stopper lying between the sealing beads and the combustion chamber through-opening, which is formed by a two-dimensional pattern, produced by flow pressing, of discrete, cup-like depressions and elevations formed by material displaced during the stamping of the depressions and associated with the depressions. The stopper has elevations and depressions on both sides of this metal layer and, consequently, can delimit the deformation of both sealing beads.

The object underlying the invention was to create a cylinder head gasket of the kind mentioned at the outset, which with respect to the sealing around a combustion chamber through-opening and the stopper function has better characteristics in the long term than the above-described known gaskets.

SUMMARY OF THE INVENTION

To achieve this object, one departs from a cylinder head gasket such as disclosed in EP-1 298 364-A, namely from a cylinder head gasket with an at least substantially metallic gasket plate comprising at least one sheet metal layer, at least one combustion chamber through-opening, a sealing bead elastically deformable in height, formed in a metal layer and surrounding the combustion chamber through-opening in a manner closed within itself, and—in relation to the sealing bead—both radially inside and radially outside the sealing bead a deformation delimiting device delimiting the bead deformation and at least partially surrounding the combustion chamber through-opening, the deformation delimiting device—in a plan view of the gasket plate—being formed close to the sealing bead and in a metal layer by such a deformation of the metal layer that the metal layer has at least one elevation in at least one of its main surfaces in the area of the deformation delimiting device, and the total thickness of the metal layer in the area of the deformation delimiting device is greater than the original thickness of the metal layer. To accomplish the set object, it is proposed, in accordance with the invention, that such a cylinder head gasket be designed such that the one deformation delimiting device comprises a bead which, in a plan view of the gasket plate, forms over at least part of its length an at least almost complete meander extending in circumferential direction of the combustion chamber through-opening, and that in a plan view of the gasket plate and in circumferential direction of the combustion chamber through-opening, the other deformation delimiting device comprises a plurality of discrete elevations.

When hereinabove mention is made of the fact that a deformation delimiting device—for reasons of simplicity referred to as stopper hereinbelow—is provided both radially inside and radially outside the sealing bead, the word "a" is not to be interpreted as "a single". Accordingly, both stoppers can be provided on the metal layer provided with the sealing bead, but one stopper or both stoppers can also be formed on another metal layer, FIGS. 1 and 2, or on two other metal layers. The stopper comprising the meander-shaped bead could also comprise a further stopper element or further stopper elements. Finally, one stopper can be provided on a functional layer provided with a sealing bead, and another stopper on another functional layer similarly provided with a sealing bead.

The basic concept underlying the present invention is thus to combine two stoppers of fundamentally different design with each other, namely one stopper having a bead with an at least partially meander-shaped form, with a stopper made of, in particular, stamped (in a type of deep-drawing or flow-pressing process) discrete, i. e., individual, elevations. Such a combination results in quite a number of advantages:

With a meandering bead closed in the shape of a ring within itself as stopper there can be created around the combustion chamber through-opening, in addition to the sealing zone formed by the sealing bead to be protected, a second sealing zone (at least when the stopper is bearing, i. e. is pressed). On the other hand, a stopper formed by discrete elevations can be subjected to higher load without the stopper height being reduced, as the number of meander loops per length unit in a meandering bead—measured in circumferential direction of the combustion chamber through-opening—is limited for deformation reasons (space is required for the arc-shaped "reversal areas" of a meandering bead), whereas the "packing density" of stamped, discrete, i. e., individual, elevations can be increased almost optionally, which involves an increase in the deformation strength of the stopper. A so-called double stopper is generally used in cylinder head gaskets intended for engines with cylinder liners. In such engines, a certain lowering of a cylinder liner inserted into an engine block is to be anticipated during engine operation, which reduces the effect of the stopper lying radially inside the sealing bead and over the liner. For this reason, a further stopper lying radially outside the sealing bead and radially outside the liner over the actual engine block is used to reliably protect the sealing bead in the long term against excessive deformation. Since the cylinder liner, the engine block and the cylinder head (between which the cylinder head gasket is clamped) usually consist of different materials, with stoppers of different design one can take the different material characteristics into consideration. Finally, a tool for stamping discrete elevations is simpler and less expensive than a tool for stamping a meandering bead.

In an inventive cylinder head gasket, the meandering bead is preferably arranged radially inside the actual sealing bead to be protected by the stopper, i. e. between the sealing bead and the combustion chamber through-opening for sealing-off against combustion gases in front of the sealing bead by means of the above-mentioned second sealing zone and for shielding the actual sealing bead to be protected by the stopper from the hot combustion gases, whereby the risk of impairing the spring-elastic behavior of the sealing bead is reduced or totally eliminated. The other deformation delimiting device of different design then lies—seen from the combustion chamber through-opening—behind the sealing bead to be protected by the double stopper.

When the stopper lying radially inside the sealing bead to be protected is to be configured as a meandering bead, combustion chambers lying very close together can result in the web areas of the cylinder head gasket lying between neighboring through-openings becoming very small, so that in the web area the ring zone remaining between a sealing bead close to the combustion chamber and the rim of a neighboring combustion chamber through-opening no longer offers enough space to also construct the radially inner stopper as a meandering bead there. In this case, in the web area or over part of the web area the bead forming the radially inner stopper can be formed differently from the meander shape, for example, in the shape of a circular arc, and if one wishes to or can dispense with the radially inner stopper forming a second sealing zone, the reverse arcs of the bead joining meander loops could also be punched away when after the reshaping of the pertinent metal layer, the combustion chamber through-opening is punched out of it. Reference is made to these embodiments because in the definition of the basic concept underlying the present invention mention is made of the fact that the one deformation delimiting device comprises a bead which over at least part of its length forms an at least almost complete meander.

In a preferred embodiment of the inventive cylinder head gasket, in a plan view of the gasket plate, the other deformation delimiting device comprises a two-dimensional pattern of discrete, knob-like elevations, which are preferably arranged in the manner of a honeycomb pattern, so as to achieve as high a packing density as possible. In an alternative embodiment, the elevations of the other deformation delimiting device (in a plan view of the gasket plate) are formed by short beads extending approximately in radial direction or at an incline thereto in relation to the combustion chamber through-opening, which preferably form a crown of such short beads enclosing the combustion chamber through-opening entirely or partially. The elevations can also be arranged in groups, between which (seen in circumferential direction of the combustion chamber through-opening) stopper-less areas lie, so as to accommodate, for example, other through-openings of the gasket plate, such as screw holes, there, or because there is insufficient space for a continuous stopper between neighboring through-openings of the gasket plate. For reasons of completion, mention is made of the fact that a stopper can also be a mixed form of the two above-described other deformation delimiting devices and comprise a mixture of groups of knob-like elevations and groups of short beads.

In addition, a stopper or each stopper of an inventive cylinder head gasket can have a height profile and/or a width profile (in a plan view of the pertinent metal layer) around a combustion chamber through-opening, as disclosed, for example, in EP-1 298 364-A, EP-1 298 365-A or U.S. Pat. No. 6,036,195.

As mentioned hereinabove, in a multilayered cylinder head gasket the radial inner and the radial outer stoppers can each be provided on one of the metal layers. It is then advisable to provide the meandering bead on a layer facing the engine block or a cylinder liner, and the stopper formed by discrete elevations on a layer facing the cylinder head.

Further features, advantages and details of the invention will be apparent from the appended claims and/or the following description and the appended drawings of two particularly advantageous embodiments of the inventive cylinder head gasket.

DETAILED DESCRIPTION OF THE INVENTION

Figure 1:
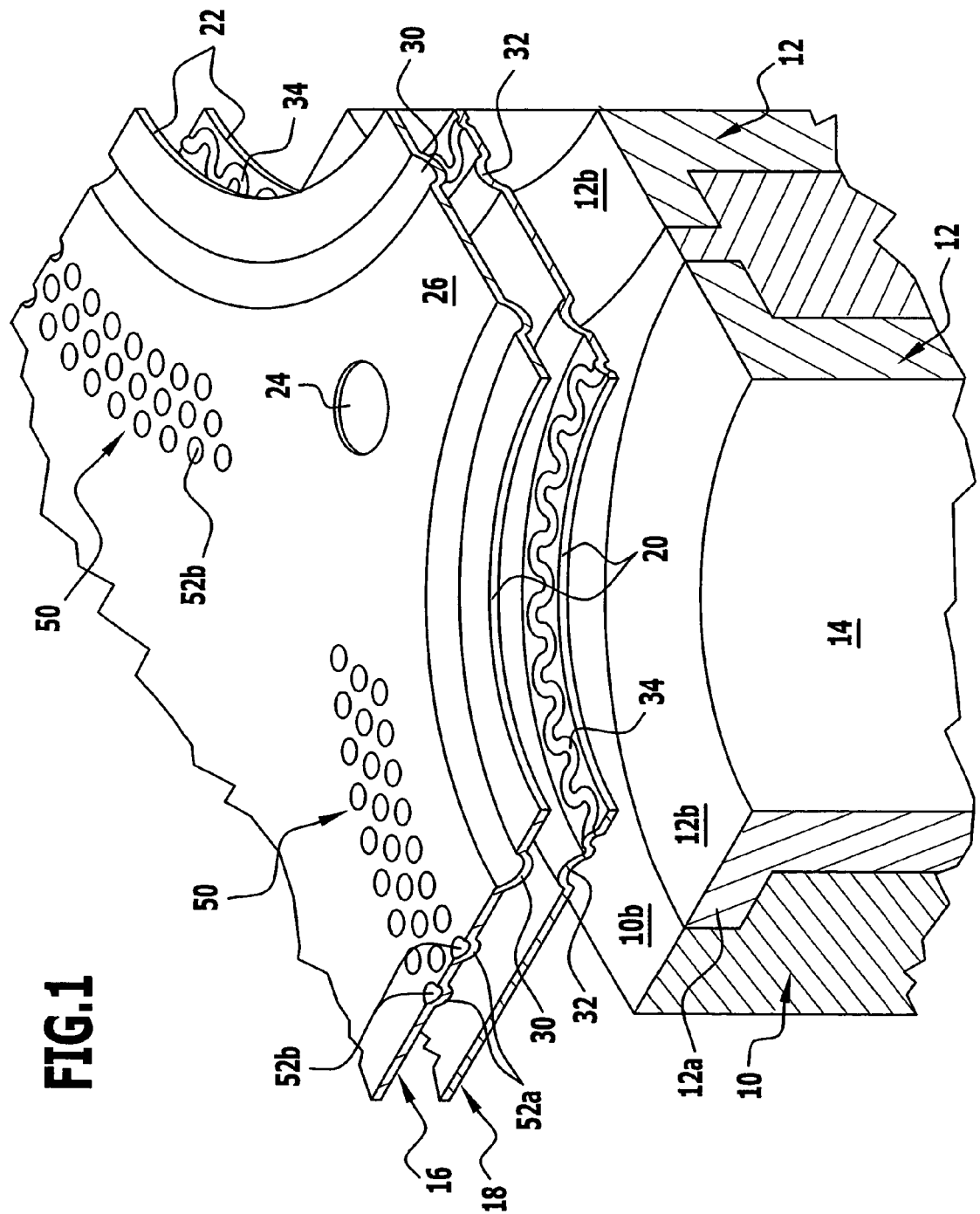
FIG. 1 shows a perspective and sectional representation of part of the first embodiment and part of an engine block provided with a cylinder liner.

FIG. 1 shows part of a crankcase or engine block 10 in which there is inserted a cylinder liner 12 whose bore forms part of a combustion chamber 14 of the engine. The liner 12 has at the top a liner collar 12a, whose upper end face forms a sealing surface 12b, which is intended to be flush with, i. e., at the same level as, a sealing surface 10b formed by an upper end face of the engine block 10.

There is clamped between the sealing surfaces 10b, 12b and a sealing surface, facing these, of a cylinder head, not illustrated, a cylinder head gasket which in the illustrated embodiment has a gasket plate comprised of an upper functional layer 16 and a lower functional layer 18 made of sheet spring steel. These could be the only metal layers of the gasket plate of the inventive cylinder head gasket, but the latter could also comprise further metal layers, for example, a smooth, i. e., flat layer lying between the two functional layers 16, 18 and/or an upper and/or a lower cover layer over the functional layer 16 or under the functional layer 18. Congruent openings lying one above the other are stamped out of all layers of the cylinder head gasket. Openings lying one above the other form a combustion chamber through-opening 20 and 22, respectively, which is associated with the combustion chamber 14 or a further combustion chamber, not shown in FIG. 1, of the engine. Also indicated in FIG. 1 is a screw through-opening 24 produced in like manner for a cylinder head screw. Between neighboring combustion chamber through-openings, the gasket plate of the cylinder head gasket comprises a web 26, only an end area of which is shown in FIG. 1. The web 26 passes into a gusset-shaped area of the gasket plate between the two combustion chamber through-openings 20 and 22, in which the screw through-opening 24 lies.

Around each combustion chamber through-opening, each of the functional layers 16 and 18 is provided with a spring-elastic sealing bead 30 and 32, respectively, deformable in height, which surrounds the associated combustion chamber through-opening in the form of a circular ring closed within itself. The two sealing beads 30, 32 face each other with their convex sides and lie sealingly against each other when the gasket is installed. Radially inside the sealing bead 32, the lower functional layer 18 is provided with an inner stopper in the form of a meandering bead 34, i. e. a meander-shaped bead in plan view, which, in particular, forms a ring closed within itself and enclosing the combustion chamber through-opening 20. The meandering bead 34 was produced in the lower functional layer 18 by stamping the lower functional layer 18 in such a way that the meandering bead 34 in accordance with FIG. 1 projects upwards above the functional layer 18, i. e., in the same direction as the sealing bead 32. However, the height of the projection formed by the meandering bead 34 is less than the height of the projection formed by the sealing bead 32, so that when the cylinder head gasket is pressed, the sealing bead 32 is first flattened somewhat in a spring-elastic manner before the meandering bead 34 has an effect (namely at the flat ring area of the upper functional layer 16 radially inside its sealing bead 30).

Seen radially outwardly from the respective combustion chamber through-opening 20 and 22 there is located in the upper functional layer 16 behind the sealing bead 30 a radially outer or rear stopper 50, formed by discrete, knob-shaped elevations 52a, which were produced by cup-like depressions 52b being stamped into the upper functional layer 16. The elevations 52a rise above the functional layer 16 in the same direction as the sealing bead 30, however, the height of the elevations is less than that of the sealing bead 30, so that they allow—like the meandering bead 34—a certain spring-elastic flattening of the sealing bead 30 when the cylinder head gasket is pressed.

In the illustrated embodiment, the elevations 52a or the depressions 52b are arranged in the manner of a honeycomb pattern, in order to achieve as large a "packing density" of the elevations as possible. The pattern formed by the elevations 52a preferably forms a ring which is concentric with the associated combustion chamber through-opening 20 and 22, respectively, but which has interruptions where screw through-openings 24 and webs 26 are located. Alternatively, the width of the pattern formed by the elevations 52a could vary such that elevations 52a are also present around the screw through-openings 24 and/or in the area of the webs 26.

In the illustrated embodiment, when the cylinder head gasket is pressed, the elevations 52a are supported on a flat area of the lower functional layer 18, but they could, in the same way as the meandering bead 34, be supported on a metal layer arranged between the functional layers 16 and 18.

As shown in FIG. 1, the rear stoppers 50 lie above the sealing surface 10b of the engine block 10, whereas the sealing beads 30 and 32 and the meandering bead 34 forming the front or radially inner stopper lie above the sealing surface 12b of the cylinder liner 12. The sealing beads 30, 32 could, however, also lie radially outside the liner 12.

In the embodiment shown in FIG. 1, the elevations 52a or the depressions 52b have approximately the shape of spherical segments and all have the same shape. They could, however, also have other shapes and/or different shapes, for example, the shapes of the depressions 52b could correspond to segments of ellipsoids or the frustum of a pyramid.

The embodiment shown in FIG. 2 differs from the embodiment according to FIG. 1 only in the configuration of the radially outer or rear stoppers, so that only these stoppers will be described hereinbelow and for all the remaining elements in FIG. 2 the same reference numerals are used as in FIG. 1.

Figure 2:
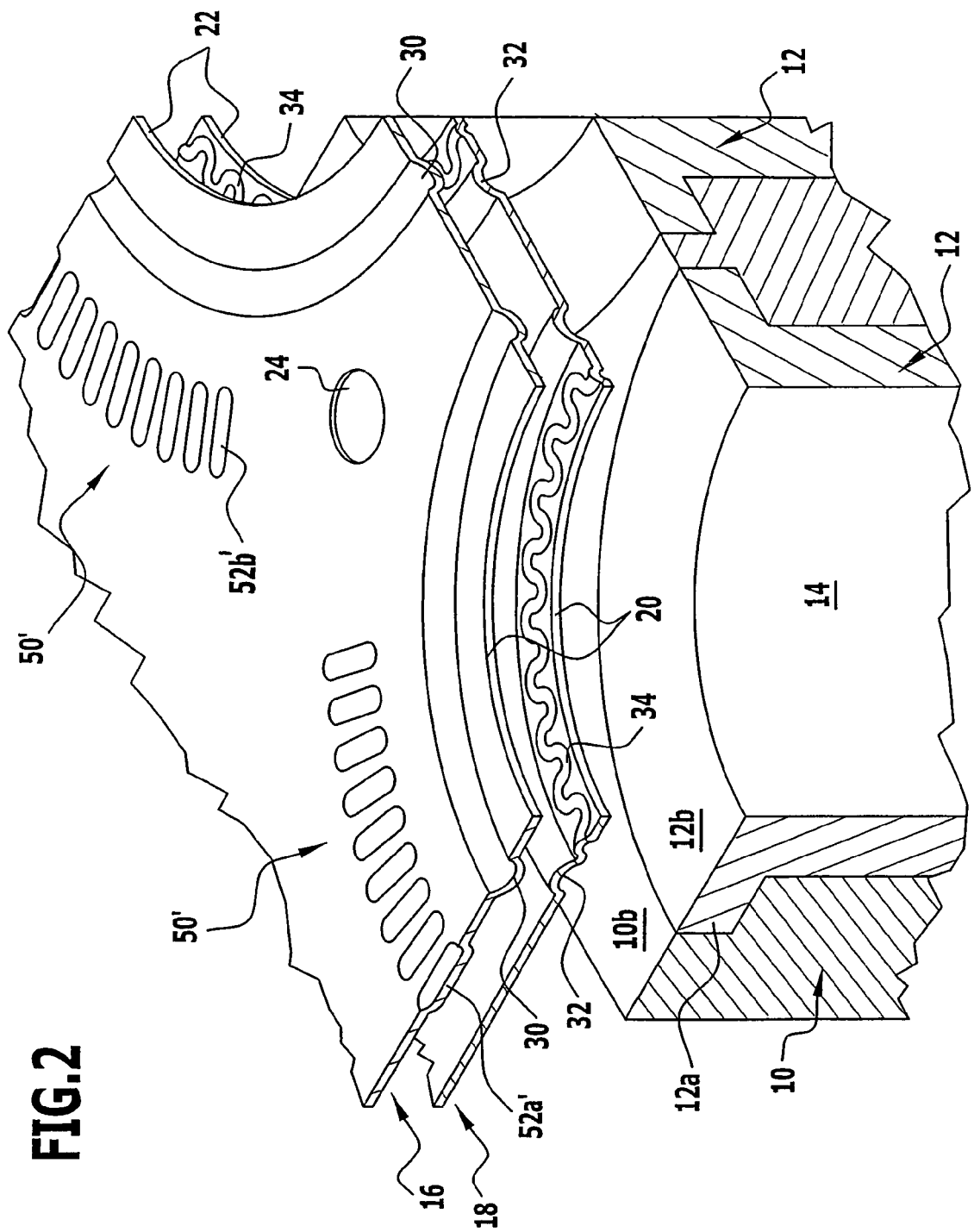
FIG. 2 shows a representation corresponding to FIG. 1 with the second embodiment of the inventive cylinder head gasket.

In the embodiment according to FIG. 2, the rear stoppers 50' are each formed by a crown of short stamped beads forming elevations 52a' and depressions 52b', which extend in radial direction in relation to the associated combustion chamber through-opening 20 and 22, respectively. These beads could, however, also include a preferably small acute angle with the radial direction. In comparison with a meandering bead, the beads 52a'—measured in circumferential direction of the associated combustion chamber through-opening—can be arranged very close to one another, as, differently from a meandering bead, no space is required for U-shaped connecting arcs.

What was said hereinabove regarding interruptions or a width profile of the stoppers 50 applies accordingly to the stoppers 50' (in the case of a width profile of a stopper 50', the beads 52a' then have different lengths).

We claim:

1. Cylinder head gasket with an at least substantially metallic gasket plate comprising one or more sheet metal layers each having a sheet thickness, at least one combustion chamber through-opening, an endless sealing bead surrounding the combustion chamber through-opening and being elastically deformable in height, said sealing bead being formed in said one or more sheet metal layers, and in relation to the sealing bead, both radially inside and radially outside the sealing bead, a deformation delimiting device delimiting a deformation of said sealing bead and surrounding the combustion chamber through-opening at least partially, each said deformation delimiting device being, in a plan view of the gasket plate, close to the sealing bead and formed by a deformation such that at least one elevation having an elevation height is formed in at least one sheet metal layer main surface in the area of each deformation delimiting device, and the total of the sheet thickness plus the elevation height in the area of each deformation delimiting device is greater than the original undeformed sheet thickness, wherein one deformation delimiting device comprises a bead which, in a plan view of the gasket plate, forms over at least part of its length an at least almost complete meandering bead shape extending in a circumferential direction of the combustion chamber through-opening, and the other deformation delimiting device comprises in a plan view of the gasket plate and in said circumferential direction of the combustion chamber through-opening a plurality of discrete elevations.

2. Cylinder head gasket in accordance with claim 1, wherein in a plan view of the gasket plate, said plurality of discrete elevations form a two-dimensional pattern of discrete, knob-like elevations.

3. Cylinder head gasket in accordance with claim 2, wherein the two-dimensional pattern includes rows of the discrete elevations with the elevations of each of said rows being offset relative to the elevations of adjacent rows.

4. Cylinder head gasket in accordance with claim 2, wherein the discrete elevations are all of the same shape in a plan view of the gasket plate.

5. Cylinder head gasket in accordance with claim 2, wherein the knob-like elevations are arranged in groups which are arranged at spacings from one another in the circumferential direction of the combustion chamber through-opening.

6. Cylinder head gasket in accordance with claim 1, wherein in a plan view of the gasket plate the elevations of the other deformation delimiting device are formed by short beads extending approximately in radial direction or at an incline thereto in relation to the combustion chamber through-opening.

7. Cylinder head gasket in accordance with claim 6, wherein the elevations form a crown of short beads enclosing the combustion chamber through-opening entirely or partially.

8. Cylinder head gasket in accordance with claim 7, wherein the short beads are arranged in groups which are arranged at spacings from one another in the circumferential direction of the combustion chamber through-opening.

9. Cylinder head gasket in accordance with claim 6, wherein the short beads are all of the same design.

10. Cylinder head gasket in accordance with claim 1, wherein said one deformation delimiting device comprising said bead is arranged radially inside the sealing bead and said other deformation delimiting device comprising said plurality of discrete elevations is arranged radially outside the sealing bead.

11. Cylinder head gasket in accordance with claim 1, wherein said one deformation delimiting device comprising said bead is formed in a first metal layer of said one or more sheet metal layers of the gasket plate and said other deformation delimiting device comprising said plurality of discrete elevations is formed in a second metal layer of said one or more sheet metal layers of the gasket plate.

12. Cylinder head gasket in accordance with claim 11, wherein said one deformation delimiting device comprising said bead is provided on said first metal layer of said one or more sheet metal layers which is close to a cylinder head and said other deformation delimiting device comprising said plurality of discrete elevations is provided on said second metal layer of said one or more sheet metal layers which is close to an engine block when the gasket is installed.

13. Cylinder head gasket in accordance with claim 1 for an engine with a cylinder liner, wherein the sealing bead and said one deformation delimiting device comprising said bead and said other deformation delimiting device comprising said plurality of discrete elevations are arranged such that said one deformation delimiting device lies over the cylinder liner and the other deformation delimiting device lies radially outside the cylinder liner when the gasket is installed.

14. Cylinder head gasket in accordance with claim 13, wherein the sealing bead also lies over the cylinder liner.

* * * * *